(12) United States Patent
Wu et al.

(10) Patent No.: US 12,284,132 B2
(45) Date of Patent: Apr. 22, 2025

(54) CHANNEL MONITORING CONTROL METHOD AND TERMINAL

(71) Applicant: VIVO MOBILE COMMUNICATION CO., LTD., Guangdong (CN)

(72) Inventors: Kai Wu, Guangdong (CN); Yanliang Sun, Guangdong (CN); Xueming Pan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 359 days.

(21) Appl. No.: 17/655,391

(22) Filed: Mar. 18, 2022

(65) Prior Publication Data
US 2022/0209920 A1      Jun. 30, 2022

Related U.S. Application Data

(63) Continuation of application No. PCT/CN2020/115903, filed on Sep. 17, 2020.

(30) Foreign Application Priority Data

Sep. 19, 2019   (CN) .......................... 201910888930.8
Oct. 30, 2019   (CN) .......................... 201911046711.1

(51) Int. Cl.
H04L 5/00        (2006.01)
H04W 24/08       (2009.01)
(Continued)

(52) U.S. Cl.
CPC .......... *H04L 5/0053* (2013.01); *H04L 5/0048* (2013.01); *H04W 24/08* (2013.01);
(Continued)

(58) Field of Classification Search
CPC . H04W 52/0274; H04W 72/23; H04W 24/08; H04W 52/0225; H04W 52/0235;
(Continued)

(56) References Cited

U.S. PATENT DOCUMENTS

2018/0368112 A1   12/2018  Sebeni et al.
2019/0254110 A1    8/2019  He et al.
(Continued)

FOREIGN PATENT DOCUMENTS

CN    101827426 A    9/2010
CN    110166190 A    8/2019
(Continued)

OTHER PUBLICATIONS

CATT, "PDCCH-Based Power Saving Signal/Channel Design," 3GPP Draft; R1-1906350_PDCCH Based Power Saving Signal Channel Design, 3rd Generation Partnership Project (3GPP), Mobile Competence Centre; 650, Route Des Lucioles; F-06921 Sophia-Antipolis Cedex; F vol. RAN WGI, No. Reno, USA; May 13, 2019-201905174, May 2019, pp. 14.
(Continued)

*Primary Examiner* — Vinncelas Louis
(74) *Attorney, Agent, or Firm* — Price Heneveld LLP

(57) ABSTRACT

The present disclosure provides a channel monitoring control method and a terminal. The method includes: performing a first operation in a case that a monitoring resource in a power saving control channel conflicts with a resource corresponding to a first behavior, where the first operation includes one of the following: monitoring the power saving control channel; skipping monitoring the power saving control channel; and skipping monitoring the power saving control channel in a control resource set CORESET based on a currently activated transmission configuration indicator TCI state.

18 Claims, 3 Drawing Sheets

```
        Start
          │
          ▼
┌─────────────────────────────────────────┐
│ Performing a first operation in a case  │
│ that a monitoring resource in a power   │
│ saving control channel conflicts with   │
│ a resource corresponding to a first     │
│ behavior, where the first operation     │── 301
│ includes one of the following:          │
│ monitoring the power saving control     │
│ channel; skipping monitoring the power  │
│ saving control channel; and skipping    │
│ monitoring the power saving control     │
│ channel in a CORESET based on a         │
│ currently activated TCI state           │
└─────────────────────────────────────────┘
          │
          ▼
         End
```

(51) Int. Cl.
*H04W 52/02* (2009.01)
*H04W 72/21* (2023.01)
*H04W 72/23* (2023.01)
*H04W 76/28* (2018.01)

(52) U.S. Cl.
CPC ... *H04W 52/0225* (2013.01); *H04W 52/0235* (2013.01); *H04W 52/028* (2013.01); *H04W 72/21* (2023.01); *H04W 72/23* (2023.01); *H04W 76/28* (2018.02)

(58) Field of Classification Search
CPC ... H04W 52/028; H04W 72/21; H04W 76/28; H04W 52/0216; H04W 52/0229; H04W 24/10; H04W 74/0833; H04W 24/02; H04L 5/0053; H04L 5/0048; H04L 5/001; Y02D 30/70
See application file for complete search history.

(56) References Cited

U.S. PATENT DOCUMENTS

| | | | |
|---|---|---|---|
| 2020/0374060 A1 | 11/2020 | Wang et al. | |
| 2021/0007050 A1* | 1/2021 | Lin | H04W 72/23 |
| 2022/0150836 A1* | 5/2022 | Seo | H04W 52/0274 |

FOREIGN PATENT DOCUMENTS

| | | |
|---|---|---|
| WO | 2018/174692 A1 | 9/2018 |
| WO | 2019099738 A1 | 5/2019 |

OTHER PUBLICATIONS

Ericsson: "PDCCH monitoring and duplex," 3GPP Draft; R2-1807021—PDCCH Monitoring and Flexible Tdd, 3rd Generation Partnership Project (3GPP), Mobile Competence Centre; 650, Route Des Lucioles; F-06921 Sophia-Antipolis Cedex; France vol. RAN WG2, No. Busan, Republic of Korea; May 21, 2018-May 25, 2018 May 20, 2018. pp. 4.
European Search Report and Opinion for European Application No. 20865771, dated Oct. 20, 2022, 03 pages.
LG Electronics, "Discussion on PDCCH-based power saving signal/channel," 3GPP Draft; R1-1908548, 3rd Generation Partnership Project (3GPP), Mobile Competence Centre; 650, Route Des Lucioles; F-06921 Sophia-Antipolis Cedex; France vol. RAN WGI, No. Prague, Czech Republic; Aug. 26, 2019-Aug. 30, 2019 Aug. 17, 2019, pp. 5.
Oppo, "Views of Power saving WI scope, "3GPP Draft; RP 191073 Views of Power Saving WI Scope, 3rd Generation Partnership Project (3GPP), Mobile Competence Centre; 650, Route Deslucioles; F-06921 Sophia-Antipolis Cedex; France vol. TSG RAN, No. Newport Beach California, USA; Jun. 3, 2019-Jun. 6, 2019 May 27, 2019, p. 4.
Samsung, "Potential physical layer procedures for NR-U,"3GPP Draft; R1-1804405 Phy Layer Procedure, 3rd Generation Partnership Project (3GPP), Mobile Competence Centre; 650, Route Des Lucioles; F-06921 Sophia-Antipolis Cedex; France vol. RAN WGI, No. Sanya, China; Apr. 16, 2018-Apr. 20, 2018, Apr. 15, 2018, pp. 6.
Vivo, "PDCCH-based power saving signal/channel design," 3GPP Draft; R1-1904103, 3rd Generation Partnership Project (3GPP), Mobile Competence Centre; 650, Route Des Lucioles; F-06921 Sophia-Antipolis Cedex; France, Apr. 2, 2019, pp. 7.
Intel Corporation, "RAN2 impacts when introducing the PDCCH-based WUS", 3GPP TSG RAN WG2 Meeting #106, R2-1906425, section 2, (May 17, 2019) 3 pages.
International Search Report from International Application No. PCTCN2020/115903, mailed Dec. 16, 2020, 5 pages.
International Written Opinion from International Application No. PCTCN2020/115903, mailed Dec 16, 2020, 4 pages.
Qualcomm Inc., "Further discussion on UE behavior upon reception of WUS", 3GPP TSG-RAN WG2 Meeting #106, R2-1906703, section 2.2, (May 17, 2019) 4 pages.
Vivo, "Remaining aspects of PDCCH-based power saving signal", 3GPP TSG RAN WG1 #99, R1-1912049, section 2.5, (Nov. 22, 2019) 11 pages.
Vivo, PDCCH-based power saving signal/channel design, 3GPP TSG RAN WG1 #98, R1-1908170, Aug. 26-30, 2019, Prague, CZ.
Qualcomm Inc, Further discussion on UE behavior upon reception of WUS, 3GPP TSG-RAN WG2 Meeting #106, R2-1906703, May 13-17, 2019, Reno, USA.
Oppo, Procedure of PDCCH-based wake up signalling, 3GPP TSG-RAN WG2 Meeting #107, R2-1908775, Aug. 26-Aug. 30, 2019, Prague, Czech Republic.
NTT Docomo, Inc., "Status Report to TSG", 3GPP TSG RAN meeting #81, RP-181723, Gold Coast, Australia, Sep. 10-13, 2018.

* cited by examiner

CHANNEL MONITORING CONTROL METHOD AND TERMINAL

CROSS-REFERENCE TO RELATED APPLICATIONS

This application is a continuation of International Application No. PCT/CN2020/115903, filed Sep. 17, 2020, designating the United States of America and published as International Patent Publication WO 2021/052420 A1 on Mar. 25, 2021, which claims priority to Chinese Patent Application No. 201910888930.8, filed with China National Intellectual Property Administration on Sep. 19, 2019, and claims priority to Chinese Patent Application No. 201911046711.1, filed with China National Intellectual Property Administration on Oct. 30, 2019, the disclosure of each of which is hereby incorporated herein in its entirety by this reference.

TECHNICAL FIELD

The present disclosure relates to the technical field of communications, and in particular, to a channel monitoring control method and a terminal.

BACKGROUND

Third-Generation Partnership Project (Third Generation Partnership Projects, 3GPP) standard protocols have introduced a power saving policy using discontinuous reception (DRX) in Long Term Evolution (LTE) systems. A network side device may instruct, through power saving control information, a terminal to perform sending or receiving in a DRX cycle, or instruct, through power saving control information, the terminal to skip the DRX cycle, that is, skip performing sending or receiving in DRX Onduration. The terminal needs to monitor a power saving control channel. A monitoring behavior on a monitoring resource in the power saving control channel may conflict with a sending or receiving behavior instructed by another network side device. When there is a resource conflict, currently there is no solution to the problem of how the terminal controls the monitoring behavior of the power saving control channel. As a result, the monitoring behavior of the power saving control channel by the terminal is not clear, affecting the communication performance of the terminal.

BRIEF SUMMARY

Embodiments of the present disclosure provide a channel monitoring control method and a terminal that can resolve the problem that when there is a resource conflict, a terminal is unclear about a monitoring behavior of a power saving control channel.

According to a first aspect, an embodiment of the present disclosure provides a channel monitoring control method. The method is performed by a terminal and includes:
performing a first operation in a case that a monitoring resource in a power saving control channel conflicts with a resource corresponding to a first behavior, where the first operation includes one of the following:
monitoring the power saving control channel;
skipping monitoring the power saving control channel; and
skipping monitoring the power saving control channel in a control resource set CORESET based on a currently activated transmission configuration indicator TCI state.

According to a second aspect, an embodiment of the present disclosure provides a terminal, including:
a first executor, configured to perform a first operation in a case that a monitoring resource in a power saving control channel conflicts with a resource corresponding to a first behavior, where the first operation includes one of the following:
monitoring the power saving control channel;
skipping monitoring the power saving control channel; and
skipping monitoring the power saving control channel in a control resource set CORESET based on a currently activated transmission configuration indicator TCI state.

According to a third aspect, an embodiment of the present disclosure provides a terminal, including: a memory, a processor, and a computer program stored in the memory and executable on the processor, where when the computer program is executed by the processor, the steps of the channel monitoring control method according to the first aspect of the embodiments of the present disclosure are implemented.

According to a fourth aspect, an embodiment of the present disclosure provides a computer-readable storage medium, where the computer-readable storage medium stores a computer program, and when the computer program is executed by a processor, the steps of the channel monitoring control method according to the first aspect of the embodiments of the present disclosure are implemented.

In the embodiments of the present disclosure, the terminal may determine a monitoring behavior of the power saving control channel according to a signal processing priority in a case that the monitoring resource in the power saving control channel conflicts with a resource corresponding to another behavior. In the embodiments of the present disclosure, the monitoring behavior performed by the terminal on the power saving control channel is determined, helping to improve communication performance of the terminal.

BRIEF DESCRIPTION OF THE DRAWINGS

To describe the technical solutions of the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. The described embodiments are merely some of the embodiments of the present disclosure rather than all of the embodiments. All other embodiments obtained by a person of ordinary skill in the art based on the embodiments of the present disclosure without creative efforts shall fall within the protection scope of the present disclosure.

In the specification and claims of this application, the term "include," and any variants thereof, is intended to cover a non-exclusive inclusion. For example, a process, method, system, product, or device that includes a series of steps or units is not necessarily limited to those steps or units that are clearly listed, but may include other steps or units not clearly listed or inherent to such a process, method, product, or device. In addition, "and/or" used in the specification and the claims means at least one of the connected objects. For example, A and/or B represents the following three cases: Only A exists, only B exists, and both A and B exist.

In addition, in the embodiments of the present disclosure, the word "exemplary" or "for example" is used to represent giving an example, an illustration, or a description. Any embodiment or design scheme described as an "exemplary" or "for example" in the embodiments of the present disclosure should not be explained as being more preferred or having more advantages than another embodiment or design scheme. Exactly, use of the word "example" or "for example" or the like is intended to present a related concept in a specific manner.

The following describes the embodiments of the present disclosure with reference to the accompanying drawings. The embodiments provided in the present disclosure may be applied to wireless communications systems. The wireless communications systems may be a 5G system, an evolved Long Term Evolution (eLTE) system, or a subsequent evolved communications system.

Figure 1:
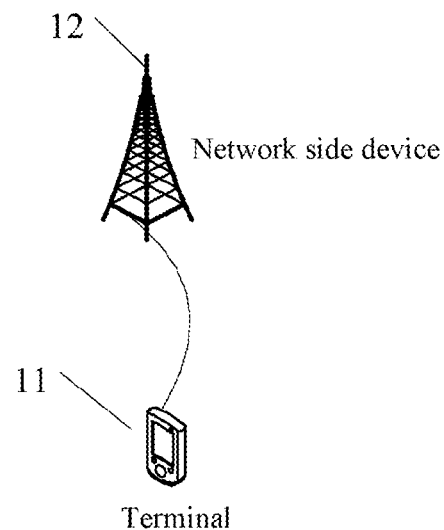
FIG. 1 is a structural diagram of a network system according to an embodiment of the present disclosure.

FIG. 1 is a structural diagram of a network system according to an embodiment of the present disclosure. As shown in FIG. 1, the network system includes a terminal 11 and a network side device 12. The terminal 11 may be a mobile communications device such as a mobile phone, a tablet personal computer (Tablet Personal Computer), a laptop computer (Laptop Computer), a personal digital assistant (PDA), a mobile Internet device (MID), or a wearable device (Wearable Device). It should be noted that a specific type of the terminal 11 is not limited in the embodiments of the present disclosure. The network side device 12 may be a 5G network side device (for example, a gNB or a 5G NR NB), or may be a 4G network side device (for example, an eNB), or may be a 3G network side device (for example, an NB), or a network side device in a subsequent evolved communications system. It should be noted that a specific type of the network side device 12 is not limited in the embodiments of the present disclosure.

Figure 2:
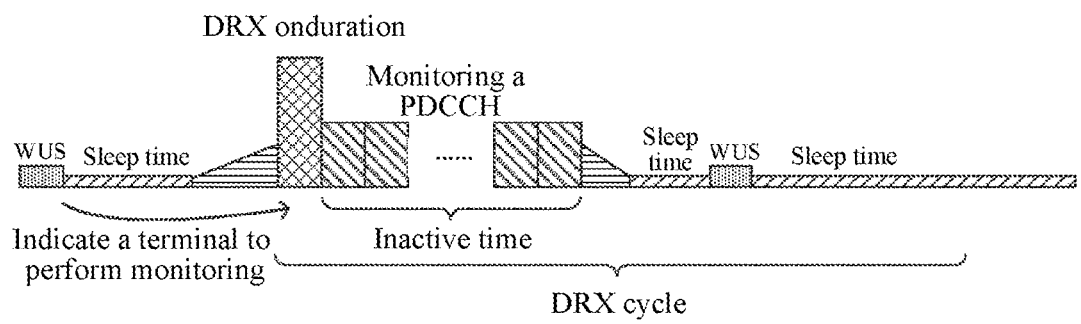
FIG. 2 is a schematic diagram of a power saving policy of DRX.

The 3GPP standard protocol introduces a power saving policy of DRX in LTE systems. The terminal 11 may periodically monitor a paging channel in a radio resource control (RRC) idle state, or may turn off a receiver circuit in an RRC connected (connected) state in most of the time when no data burst frame is transmitted, and only keep periodically monitoring a physical downlink control channel (PDCCH). As shown in FIG. 2, in each DRX cycle (DRX cycle), before the terminal 11 performs DRX, the network side device 12 may transmit control information to the terminal 11 through a control channel, and the terminal 11 can detect the control information at a corresponding moment. When the terminal 11 detects the control information, or when the terminal 11 detects the control information that indicates the terminal to monitor a PDCCH in DRX Onduration of the DRX cycle, the terminal 11 can start a discontinuous reception onduration timer (DRX OnDurationTimer) or monitor a PDCCH in DRX OnDuration of the DRX cycle. Otherwise, the terminal 11 does not start the DRX Onduration timer, or does not monitor a PDCCH in DRX Onduration of the DRX cycle. The control information for transmitting the foregoing information may be considered as a wake-up signal and is a type of power saving control information. Further, when detecting, in the DRX Onduration, a PDCCH that schedules data, the terminal 11 starts a DRX inactive timer (inactive timer) and continues to monitor a control channel in an inactive time. Time segments corresponding to the DRX Onduration timer and the DRX inactive timer are both a DRX active time (active time).

The network side device 12 may notify, through power saving control information, the terminal 11 to perform sending or receiving in DRX OnDuration of a DRX cycle, or notify, through power saving control information, the terminal 11 to skip the DRX cycle, that is, skip performing sending or receiving in DRX Onduration. The terminal 11 needs to monitor a power saving control channel. A monitoring behavior on a monitoring resource in the power saving control channel may conflict with a sending or receiving behavior (for example, a sending or receiving behavior of another physical signal) indicated by another network side device. To be specific, the monitoring behavior and another sending or receiving behavior occur at the same time or at times close to each other. For example, the monitoring behavior and another sending or receiving behavior occur on a same OFDM symbol or on OFDM symbols close to each other. As a result, the monitoring resource in the power saving control channel conflicts with a resource corresponding to the another behavior.

The power saving control channel is a control channel used to transmit power saving control information, or the power saving control channel is a control channel scrambled by using a PS-RNTI (power saving-RNTI).

In addition to transmitting a wake-up signal, the control channel may further transmit control information that indicates the terminal to perform another behavior. Examples are as follows:
  the terminal device switches a bandwidth part (bandwidth Part, BWP);
  the terminal device activates or deactivates an object, where the object is a cell group or a carrier group;
  a (maximum) number of transport layers changes;
  the terminal device triggers reporting of channel state information;
  the terminal device triggers sending of a sounding reference signal;
  the terminal device receives a tracking reference signal;
  the terminal device receives a channel state information reference signal; and
  whether the terminal device performs at least one of beam management measurement, radio link monitoring measurement, and radio resource management measurement in a DRX active time.

In the foregoing case of resource conflict, the embodiments of the present disclosure provide a channel monitoring control method and a terminal, to determine a monitoring behavior of the terminal when monitoring of the power saving control channel conflicts with another behavior, and further determine whether to perform a behavior of monitoring a PDCCH in DRX Onduration by the terminal when the terminal cannot monitor the power saving control channel due to a conflict. The following describes the embodiments of the present disclosure in detail.

Figure 3:
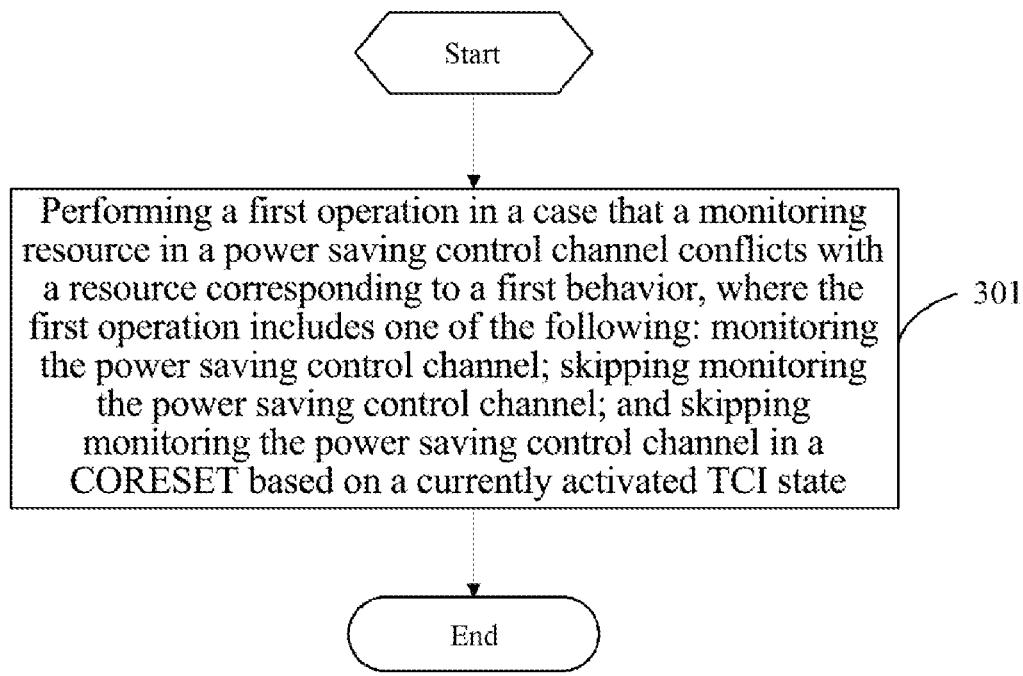
FIG. 3 is a flowchart of a channel monitoring control method according to an embodiment of the present disclosure.

FIG. 3 is a flowchart of a channel monitoring control method according to an embodiment of the present disclosure. As shown in FIG. 3, the channel monitoring control method is performed by a terminal, and includes the following steps:

step 301: Performing a first operation in a case that a monitoring resource in a power saving control channel conflicts with a resource corresponding to a first behavior, where the first operation includes one of the following: monitoring the power saving control channel; skipping monitoring the power saving control channel; and skipping monitoring the power saving control channel in a control resource set (CORESET) based on a currently activated transmission configuration indicator (TCI) state.

The power saving control channel may be referred to as a power saving PDCCH, and may also be abbreviated as PS-PDCCH. WUS information may be a type of indication information transmitted on the power saving PDCCH. The monitoring resource in the power saving control channel may be understood as a monitoring occasion of the power saving control channel. Each monitoring occasion may include at least one OFDM symbol. The first behavior may be a behavior other than the monitoring behavior of the power saving control channel, for example, may be a sending or receiving behavior of another physical signal. That the monitoring resource in the power saving control channel conflicts with the resource corresponding to the first behavior may be understood as: on the monitoring occasion of the power saving control channel, the terminal needs to receive or send a signal corresponding to the first behavior, for example, monitor a control channel, transmit an SRS, or report CSI. That the monitoring resource in the power saving control channel conflicts with the resource corresponding to the first behavior may also be understood as: the monitoring resource in the power saving control channel overlaps the resource corresponding to the first behavior.

In the embodiments of the present disclosure, the terminal may determine a monitoring behavior of the power saving control channel according to a signal processing priority in a case that the monitoring resource in the power saving control channel conflicts with a resource corresponding to another behavior. For example, when the priority of monitoring of the power saving control channel is higher, the first operation may be monitoring the power saving control channel; and when the priority of monitoring of the power saving control channel is lower, the first operation may be skipping monitoring the power saving control channel; or when the priority of monitoring of the power saving control channel is lower, the first operation may be skipping monitoring the power saving control channel in a CORESET based on a currently activated TCI state.

In the foregoing solution, in this embodiment of the present disclosure, in a case that the monitoring resource in the power saving control channel conflicts with a resource corresponding to another behavior, the monitoring behavior performed by the terminal on the power saving control channel is determined, thereby improving communication performance of the terminal.

In an embodiment, the first behavior includes at least one of the following:

synchronization signal/physical broadcast channel block (PBCH block) or synchronization signal block (SSB) measurement or channel state information reference signal (CSI-RS) measurement;

downlink control information (DCI) indicates that a part of a time domain resource of the monitoring resource in the power saving control channel is an uplink time domain resource or a flexible time domain resource;

DCI indicates that a part of the time domain resource of the monitoring resource in the power saving control channel is used to transmit a physical uplink control channel (PUCCH), a physical uplink shared channel (PUSCH), a physical random access channel (PRACH), or a sounding reference signal (Sounding Reference Signal, SRS);

after initiating random access, the terminal monitors, on a part of the time domain resource of the monitoring resource in the power saving control channel, a PDCCH scrambled by using a random access radio network temporary identifier (RA-RNTI), and omits an activated TCI state of a CORESET associated with a random access response (RAR) search space (search space);

a serving cell of the terminal changes;

a DRX state of the terminal changes;

a BWP of the terminal changes; and the terminal performs monitoring in S CORESETs on a time domain resource for monitoring the power saving control channel, where S is greater than 1.

A part of the time domain resource of the monitoring resource in the power saving control channel may be at least one orthogonal frequency division multiplexing (Orthogonal Frequency Division Multiplexing, OFDM) symbol (symbol) in the monitoring occasion of the power saving control channel.

That DCI indicates that a part of the time domain resource of the monitoring resource in the power saving control channel is an uplink time domain resource or a flexible time domain resource may include the following implementation: the DCI indicates that some OFDM symbols in the monitoring occasion of the power saving control channel are flexible symbols (flexible symbol) or uplink symbols (uplink symbol).

That DCI indicates that a part of the time domain resource of the monitoring resource in the power saving control channel is used to transmit a PUCCH, a PUSCH, a PRACH, or an SRS may include the following implementation: the DCI indicates that some OFDM symbols in the monitoring occasion of the power saving control channel are used to transmit a PUCCH, a PUSCH, a PRACH, or an SRS.

In the embodiments of the present disclosure, in a case that the monitoring resource in the power saving control channel conflicts with resources corresponding to the foregoing first behaviors, the terminal may monitor the power saving control channel; or skip monitoring the power saving control channel; or skip monitoring the power saving control channel in a CORESET based on a currently activated TCI state.

In the embodiments of the present disclosure, when the first behavior includes SSB measurement or CSI-RS measurement, the SSB measurement or the CSI-RS measurement can include at least one of radio resource management (Radio Resource Management, RRM) measurement, radio link monitoring (RLM) measurement, beam failure recovery (BFR) measurement, and layer 1 reference signal received power (LI-RSRP) measurement.

The RRM measurement may include at least one of intra-frequency (intra-frequency) measurement, inter-frequency (inter-frequency) measurement, and inter-RAT (inter-RAT) measurement. The RLM measurement may be understood as measurement for assessing whether quality of a link signal is higher than a threshold (for example, Qin) or is lower than a threshold (for example, Qout). The BFR measurement can include at least one of measurement for assessing, by the terminal, whether quality of a signal is lower than a threshold (for example, Qout) based on a beam failure detection-reference signal (Beam Failure Detection-Reference Signal, BFD-RS) and measurement of a candidate beamlist RS.

In an embodiment, when the first behavior includes the SSB measurement or the CSI-RS measurement, when the monitoring resource in the power saving control channel and a measurement resource corresponding to the SSB measurement or the CSI-RS measurement are overlapped on any time domain resource, it is determined that the monitoring resource in the power saving control channel conflicts with the measurement resource corresponding to the SSB measurement or the CSI-RS measurement.

For example, when a monitoring occasion for monitoring a WUS by the terminal and a measurement resource (an SSB or a CSI-RS) are overlapped on any OFDM symbol, it may be determined that the monitoring resource in the power saving control channel conflicts with the measurement resource corresponding to the SSB measurement or the CSI-RS measurement.

In an embodiment, when the first behavior includes the SSB measurement or the CSI-RS measurement, when a time interval between the monitoring resource in the power saving control channel and a measurement resource corresponding to the SSB measurement or the CSI-RS measurement is less than or equal to a preset value, it is determined that the monitoring resource in the power saving control channel conflicts with the measurement resource corresponding to the SSB measurement or the CSI-RS measurement.

For example, when the monitoring occasion for monitoring a WUS by the terminal is on x (for example, x=1) OFDM symbols before the measurement resource (an SSB or a CSI-RS) or on x OFDM symbols after the measurement resource (an SSB or a CSI-RS), it may be determined that the monitoring resource in the power saving control channel conflicts with the measurement resource corresponding to the SSB measurement or the CSI-RS measurement.

In an embodiment, when the terminal skips monitoring the power saving control channel in a CORESET based on a currently activated TCI state, the method further includes:
  monitoring the control channel in the CORESET associated with the RAR search space based on the activated TCI state of the CORESET associated with the RAR search space.

The control channel is a control channel scrambled by using an RA-RNTI, a cell radio network temporary identifier (C-RNTI), or a modulation and coding scheme cell radio network temporary identifier (Modulation and coding scheme Cell Radio Network Temporary Identifier, MCS-C-RNTI).

That the terminal monitors a control channel means that the terminal decodes the control channel on at least one target PDCCH candidate resource in a search space set (search space sets) associated with a CORESET.

In this implementation, although the terminal does not monitor the power saving control channel in a CORESET based on the currently activated TCI state, the terminal may still monitor the control channel. Herein, the terminal can monitor the control channel in the CORESET associated with the RAR search space based on the activated TCI state of the CORESET associated with the RAR search space.

In this embodiment of the present disclosure, when the priority of monitoring of the power saving control channel is lower, the terminal may not monitor the power saving control channel in a CORESET based on the currently activated TCI state, and instead can monitor the control channel in the CORESET associated with the RAR search space based on the activated TCI state of the CORESET associated with the RAR search space. In this way, the priority of signal processing is fully considered, and monitoring of the control channel is implemented as much as possible.

In this embodiment of the present disclosure, behaviors such as the serving cell of the terminal changes, the DRX state of the terminal changes, and the BWP of the terminal changes are all behaviors indicating that a state of the terminal changes. When resources corresponding to these behaviors conflict with the monitoring resource in the power saving control channel, the terminal may give up monitoring the power saving control channel, that is, the terminal may not monitor the power saving control channel.

When the terminal is configured with carrier aggregation (CA) or dual connectivity (Dual Connectivity, DC), some factors may cause interruption of the terminal, that is, some factors may cause the foregoing change of the state of the terminal. The following describes different cases.

First, in a case of EN-DC (dual connectivity with MCG using E-UTRA and SCG using NR, E-UTRA NR dual connectivity with MCG using E-UTRA and SCG using NR), interruption of the terminal in a primary secondary cell (Primary secondary cell, PScell) or a secondary cell (Secondary Cell, Scell) of a secondary cell group is caused by the following factors:
  during DRX, a primary cell (Primary cell, Pcell) of evolved UMTS terrestrial radio access (Evolved Universal Terrestrial Radio Access, E-UTRA) switches between a DRX active state and a DRX inactive state; or
  an E-UTRA Pcell switches from non-DRX to DRX; or
  an E-UTRA Scell in a master cell group (Master cell group, MCG) or an E-UTRA Scell in a secondary cell group (Secondary Cell Group, SCG) is added or released; or
  an E-UTRA Scell in an MCG or an E-UTRA Scell in an SCG is activated or deactivated; or
  measurement on a secondary component carrier (Secondary Component Carrier, SCC) of an inactive Scell in an E-UTRA MCG or a new radio (New Radio, NR) SCG; or
  an UL/DL (uplink/downlink, uplink or downlink) BWP switches between a PScell or an Scell in an SCG; or
  a secondary UL carrier or an UL carrier is configured or deconfigured.

Second, in a case of standalone (SA) NR CA, interruption of the terminal in a Pcell or an active Scell is caused by the following factors:
  the Scell is configured, deconfigured, activated, or deactivated; or a secondary UL carrier or an UL carrier is configured or deconfigured; or measurement on an SCC of an inactive Scell in an NR SCG; or an UL/DL BWP switches between a PScell or an Scell in an SCG.

Third, in a case of NE-DC (NR-E-UTRA Dual Connectivity, NR-E-UTRA dual connectivity), interruption of the terminal in a Pcell or an Scell is caused by the following factors:

during DRX, an E-UTRA PScell switches between a DRX active state and a DRX inactive state; or an E-UTRA PScell switches from non-DRX to DRX; or an E-UTRA PScell or Scell in an SCG or an E-UTRA SCell in an MCG is added or released; or an E-UTRA PScell or Scell in an SCG or an E-UTRA SCell in an MCG is activated or deactivated; or measurement on an SCC of an inactive Scell in an E-UTRA SCG or an NR MCG; or a PUSCH/PUCCH carrier in an NR MCG is configured and deconfigured; or an UL/DL BWP switches between a Pcell or an Scell in an MCG.

Fourth, in a case of NR-DC, interruption of the terminal in a Pcell, a PScell, or a Scell is caused by the following factors:

Scells are configured, deconfigured, activated, or deactivated; or a secondary UL carrier or an UL carrier is configured or deconfigured; or measurement on an SCC of an inactive Scell in an NR SCG; or an UL/DL BWP switches among a Pcell, a PScell, and a Scell; or during DRX, switching between an active state and an inactive state, or switching from non-DRX to DRX.

When the foregoing behaviors occur, the terminal cannot perform a downlink reception operation. When the foregoing behaviors conflict with a monitoring occasion of a PS-PDCCH, the terminal may not be capable of monitoring the PS-PDCCH.

In this embodiment of the present disclosure, on the time domain resource for monitoring the power saving control channel, the terminal may need to perform monitoring in a plurality of (that is, S) CORESETs. In this case, a resource corresponding to the behavior of performing monitoring in the plurality of CORESETs by the terminal conflicts with the monitoring resource in the power saving control channel, and the terminal may prioritize monitoring of the power saving control channel, or may give up monitoring the power saving control channel.

Further, when the priority of the behavior of performing monitoring in the plurality of CORESETs by the terminal is lower, the terminal may give up monitoring the power saving control channel; or when the priority of the behavior of performing monitoring in the plurality of CORESETs by the terminal is higher, the terminal may prioritize monitoring of the power saving control channel.

Further, the terminal may give up monitoring some PDCCHs when QCL-TypeD attributes on overlapped PDCCH monitoring resources are different.

When the terminal monitors PDCCHs with different QCL-TypeD attributes in PDCCH monitoring occasions overlapped in time, when the terminal is configured with only one serving cell or works in a same band through carrier aggregation, and monitors a plurality of PDCCH candidates in a plurality of CORESETs in monitoring occasions overlapped in time, where a plurality of CORESETs on active BWPs of a plurality of cells have a same QCL-TypeD attribute or different QCL-TypeD attributes, the terminal monitors only one CORESET and monitors a PDCCH in one or more other CORESETs that have a same QCL-TypeD attribute as that of the CORESET. These CORESETs are located on active BWPs of one or more serving cells.

Further, when a public search space is configured in the CORESET, the CORESET is a CORESET with the lowest CORESET number corresponding to the lowest public search space number. Otherwise, a CORESET with the lowest CORESET number corresponding to the lowest search space set number of the terminal is selected. The lowest search space set number is determined in a UE search space set of all UE search space sets that has at least one PDCCH candidate UE in PDCCH monitoring occasions overlapped in time. When monitoring a CORESET is determined, it is considered that a QCL attribute of an SSB is different from that of a CSI-RS.

In the foregoing cases, because the terminal cannot monitor a PS-PDCCH or because the terminal cannot monitor the power saving control channel, in this embodiment of the present disclosure, a behavior further performed by the terminal when the terminal cannot monitor a PS-PDCCH is further determined. Details are as follows:

In an embodiment, when the terminal skips monitoring the power saving control channel, the method further includes:

performing a default behavior in DRX Onduration associated with the monitoring resource in the power saving control channel; or skipping performing a default behavior in DRX Onduration associated with the monitoring resource in the power saving control channel, where the default behavior includes at least one of the following:

starting a DRX Onduration timer;

monitoring a PDCCH according to a configuration of a network side device;

periodically or semi-persistently transmitting an SRS according to a configuration of a network side device;

periodically or semi-persistently reporting channel state information (Channel State Information, CSI) according to a configuration of a network side device; and performing the SSB measurement or the CSI-RS measurement.

Figure 4:
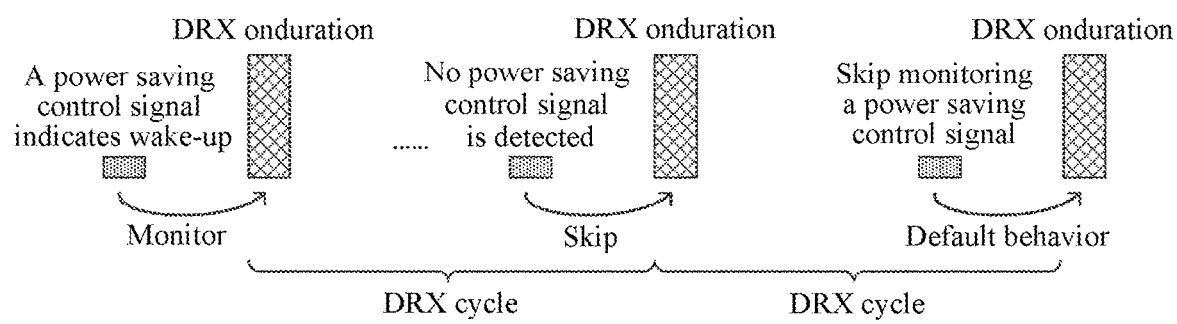
FIG. 4 is a schematic diagram of a monitoring behavior of a terminal according to an embodiment of the present disclosure.

In this implementation, a behavior further performed by the terminal when the terminal does not monitor the power saving control channel is determined. As shown in FIG. 4, on one hand, the terminal may perform the default behavior in the DRX Onduration associated with the power saving control channel. For example, the terminal may perform sending and reception by default in the DRX Onduration, the terminal may start the DRX Onduration timer, and the terminal may perform SSB measurement or CSI-RS measurement by default in the DRX Onduration. In this way, a service delay of the terminal may be reduced, ensuring link reliability. One another hand, the terminal may not perform the default behavior in the DRX Onduration associated with the power saving control channel. For example, the terminal may not perform sending and reception in the DRX Onduration, the terminal may not start the DRX Onduration timer, and the terminal may not perform SSB measurement or CSI-RS measurement in the DRX Onduration. In this way, power consumption of the terminal may be reduced.

Figure 5:
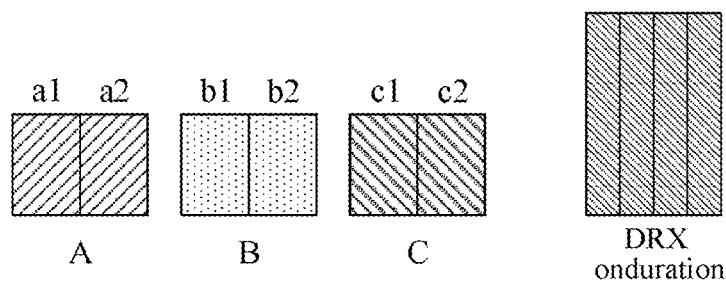
FIG. 5 is a schematic diagram of a monitoring occasion configuration according to an embodiment of the present disclosure.

In an embodiment, when the network side device configures N monitoring resources of the power saving control channel and the terminal gives up monitoring the power saving control channel on M monitoring resources, the terminal performs the default behavior in the discontinuous reception onduration associated with the monitoring resource in the power saving control channel, where N is greater than or equal to 1, and M is less than or equal to N. As shown in FIG. 5, before DRX Onduration, the network side device configures six monitoring occasions of the power saving control channel. The six monitoring occasions are a1, a2, b1, b2, c1, and c2, respectively.

M may be 1 or N, or may be greater than a threshold or a ratio.

In this way, a service delay of the terminal may be reduced, ensuring link reliability.

Further, before the DRX Onduration, the network side device configures a plurality of monitoring occasions of the power saving control channel. When monitoring of one of all power saving control channels in one of the monitoring occasions is canceled, the terminal performs the default behavior in the DRX Onduration associated with monitoring of the power saving control channel. When monitoring of all power saving control channels in one of the monitoring occasions is canceled, the terminal also performs the default behavior in the DRX Onduration associated with monitoring of the power saving control channel.

Further, when the terminal cannot perform monitoring on some monitoring resources due to a resource conflict, but still detects a power saving control channel on a remaining monitoring resource, the terminal can perform a sending or receiving operation according to an indication of the power saving control channel. When the terminal cannot perform monitoring on some monitoring resources due to a resource conflict and detects no power saving control channel on a remaining monitoring resource, the terminal may perform the default behavior.

In an embodiment, when the network side device configures that the terminal monitors the power saving control channel in X CORESETs and the terminal gives up monitoring the power saving control channel on all monitoring resources corresponding to Y CORESETs, the terminal performs the default behavior in the discontinuous reception onduration associated with the monitoring resource in the power saving control channel, where X is greater than or equal to 1, and Y is less than or equal to X. As shown in FIG. 5, before the DRX Onduration, the network side device configures monitoring occasions corresponding to 3 CORESETs (or search spaces). The 3 CORESETs are A, B, and C, respectively. Each CORESET includes two monitoring occasions.

In this way, a service delay of the terminal may be reduced, ensuring link reliability.

Further, before the DRX Onduration, the network side device configures that the terminal monitors the power saving control channel in a plurality of CORESETs/search spaces. When monitoring is given up in a monitoring occasion corresponding to a CORESET/search space, the terminal performs the default behavior.

Further, when the terminal cannot perform monitoring on some monitoring resources due to a resource conflict, but still detects a power saving control channel on a remaining monitoring resource, the terminal can perform a sending or receiving operation according to an indication of the power saving control channel. When the terminal cannot perform monitoring on some monitoring resources due to a resource conflict and detects no power saving control channel on a remaining monitoring resource, the terminal may perform the default behavior.

In an embodiment, when the network side device configures that the terminal monitors the power saving control channel based on L TCI states and the terminal gives up monitoring the power saving control channel on all monitoring resources corresponding to P TCI states, the terminal performs the default behavior in the discontinuous reception onduration associated with the monitoring resource in the power saving control channel, where L is greater than or equal to 1, and P is less than or equal to L. As shown in FIG. 5, before the DRX Onduration, the network side device configures monitoring occasions corresponding to 3 TCI states. The 3 TCI states are A, B, and C, respectively, and each TCI state includes two monitoring occasions.

In this way, a service delay of the terminal may be reduced, ensuring link reliability.

Further, before the DRX Onduration, the network side device configures that the terminal monitors the power saving control channel based on a plurality of TCI states. When monitoring is given up in a monitoring occasion corresponding to a TCI state or a quasi co-location (QCL) assumption (assumption), the terminal performs the default behavior.

Further, when the terminal cannot perform monitoring on some monitoring resources due to a resource conflict, but still detects a power saving control channel on a remaining monitoring resource, the terminal can perform a sending or receiving operation according to an indication of the power saving control channel. When the terminal cannot perform monitoring on some monitoring resources due to a resource conflict and detects no power saving control channel on a remaining monitoring resource, the terminal may perform the default behavior.

In an embodiment, the method further includes:
  receiving RRC information sent by the network side device; and
  when the RRC information indicates the terminal to perform the default behavior, performing, by the terminal, the default behavior in the discontinuous reception onduration associated with the monitoring resource in the power saving control channel; or
  when the RRC information indicates the terminal not to perform the default behavior, skipping, by the terminal, performing the default behavior in the discontinuous reception onduration associated with the monitoring resource in the power saving control channel.

In this implementation, the network side device can configure, through RRC information, whether the terminal performs the default behavior. In this way, the terminal can determine a specific behavior according to the RRC information after receiving the RRC information configured by the network side device.

The default behavior may include all or some sending or receiving operations in the DRX Onduration or DRX active time. The sending or receiving operations include: monitoring a PDCCH according to a configuration of a network side device; periodically or semi-persistently transmitting an SRS according to a configuration of a network side device; periodically or semi-persistently reporting CSI according to a configuration of a network side device; and performing the SSB measurement or the CSI-RS measurement.

As can be seen from above, the embodiments of the present disclosure provide a channel monitoring control method in a case that the monitoring resource in the power saving control channel conflicts with the resource corresponding to another behavior. In the method, a monitoring behavior of the terminal is determined when monitoring of the power saving control channel conflicts with another behavior, and it is further determined whether to perform a behavior of monitoring a PDCCH in DRX Onduration by the terminal when the terminal cannot monitor the power saving control channel due to a conflict.

Figure 6:
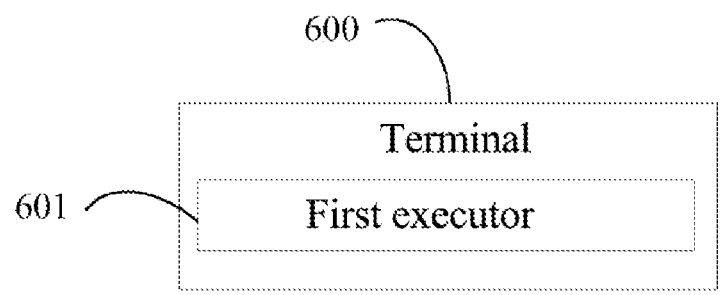
FIG. 6 is a schematic structural diagram of a terminal according to an embodiment of the present disclosure.

FIG. 6 is a structural diagram of a terminal according to an embodiment of the present disclosure. As shown in FIG. 6, a terminal 600 includes:
- a first executor 601, configured to perform a first operation in a case that a monitoring resource in a power saving control channel conflicts with a resource corresponding to a first behavior, where
- the first operation includes one of the following:
- monitoring the power saving control channel;
- skipping monitoring the power saving control channel; and
- skipping monitoring the power saving control channel in a control resource set CORESET based on a currently activated transmission configuration indicator TCI state.

In an embodiment, the first behavior includes at least one of the following:
- synchronization signal block SSB measurement or channel state information reference signal CSI-RS measurement;
- downlink control information DCI indicates that a part of a time domain resource of the monitoring resource in the power saving control channel is an uplink time domain resource or a flexible time domain resource;
- DCI indicates that a part of the time domain resource of the monitoring resource in the power saving control channel is used to transmit a physical uplink control channel PUCCH, a physical uplink shared channel PUSCH, a physical random access channel PRACH, or a sounding reference signal SRS;
- after initiating random access, the terminal monitors, on a part of the time domain resource in a monitoring occasion of the power saving control channel, a physical downlink control channel PDCCH scrambled by using a random access radio network temporary identifier RA-RNTI, and omits an activated TCI state of a CORESET associated with a random access response RAR search space;
- a serving cell of the terminal changes;
- a discontinuous reception DRX state of the terminal changes;
- an activated bandwidth part BWP of the terminal changes; and
- the terminal performs monitoring in S CORESETs on a time domain resource for monitoring the power saving control channel, where S is greater than 1.

In an embodiment, the SSB measurement or the CSI-RS measurement includes at least one of radio resource management RRM measurement, radio link monitoring RLM measurement, beam failure recovery BFR measurement, and layer 1 reference signal received power L1-RSRP measurement.

In an embodiment, the terminal 600 further includes a determiner, configured to:
- when the monitoring resource in the power saving control channel and a measurement resource corresponding to the SSB measurement or the CSI-RS measurement are overlapped on any time domain resource, determine that the monitoring resource in the power saving control channel conflicts with the measurement resource corresponding to the SSB measurement or the CSI-RS measurement; or,
- when a time interval between the monitoring resource in the power saving control channel and a measurement resource corresponding to the SSB measurement or the CSI-RS measurement is less than or equal to a preset value, determine that the monitoring resource in the power saving control channel conflicts with the measurement resource corresponding to the SSB measurement or the CSI-RS measurement.

In an embodiment, when the terminal skips monitoring the power saving control channel in a CORESET based on a currently activated TCI state, the terminal further includes:
- a monitor, configured to monitor the control channel in the CORESET associated with the RAR search space based on the activated TCI state of the CORESET associated with the RAR search space.

In an embodiment, when the terminal skips monitoring the power saving control channel, the terminal 600 further includes a second executor, configured to:
- perform a default behavior in discontinuous reception onduration associated with monitoring of the power saving control channel; or,
- skip performing a default behavior in discontinuous reception onduration associated with monitoring of the power saving control channel, where
- the default behavior includes at least one of the following:
- starting a discontinuous reception onduration timer;
- monitoring a PDCCH according to a configuration of a network side device;
- periodically or semi-persistently transmitting an SRS according to a configuration of a network side device;
- periodically or semi-persistently reporting channel state information CSI according to a configuration of a network side device; and
- performing the SSB measurement or the CSI-RS measurement.

In an embodiment, the second executor is specifically configured to:
- when the network side device configures N monitoring resources of the power saving control channel and the terminal gives up monitoring the power saving control channel on M monitoring resources, perform, by the terminal, the default behavior in the discontinuous reception onduration associated with the monitoring resource in the power saving control channel, where N is greater than or equal to 1, and M is less than or equal to N; or,
- when the network side device configures that the terminal monitors the power saving control channel in X CORESETs and the terminal gives up monitoring the power saving control channel on all monitoring resources corresponding to Y CORESETs, perform, by the terminal, the default behavior in the discontinuous reception onduration associated with the monitoring resource in the power saving control channel, where X is greater than or equal to 1, and Y is less than or equal to X; or,
- when the network side device configures that the terminal monitors the power saving control channel based on L TCI states and the terminal gives up monitoring the power saving control channel on all monitoring resources corresponding to P TCI states, perform, by the terminal, the default behavior in the discontinuous reception onduration associated with the monitoring resource in the power saving control channel, where L is greater than or equal to 1, and P is less than or equal to L.

In an embodiment, the terminal 600 further includes:
a receiver, configured to receive radio resource control RRC information sent by the network side device; and
when the RRC information indicates the terminal to perform the default behavior, the second executor is configured to perform the default behavior in the discontinuous reception onduration associated with the monitoring resource in the power saving control channel; or
when the RRC information indicates the terminal not to perform the default behavior, the second executor is configured to skip performing the default behavior in the discontinuous reception onduration associated with the monitoring resource in the power saving control channel.

It should be noted that the terminal 600 in this embodiment of the present disclosure may be the terminal in any implementation in the method embodiments. Any implementation of the terminal in the method embodiments may be implemented by the terminal 600 in this embodiment of the present disclosure, and a same beneficial effect is achieved. To avoid repetition, details are not described herein again.

Figure 7:
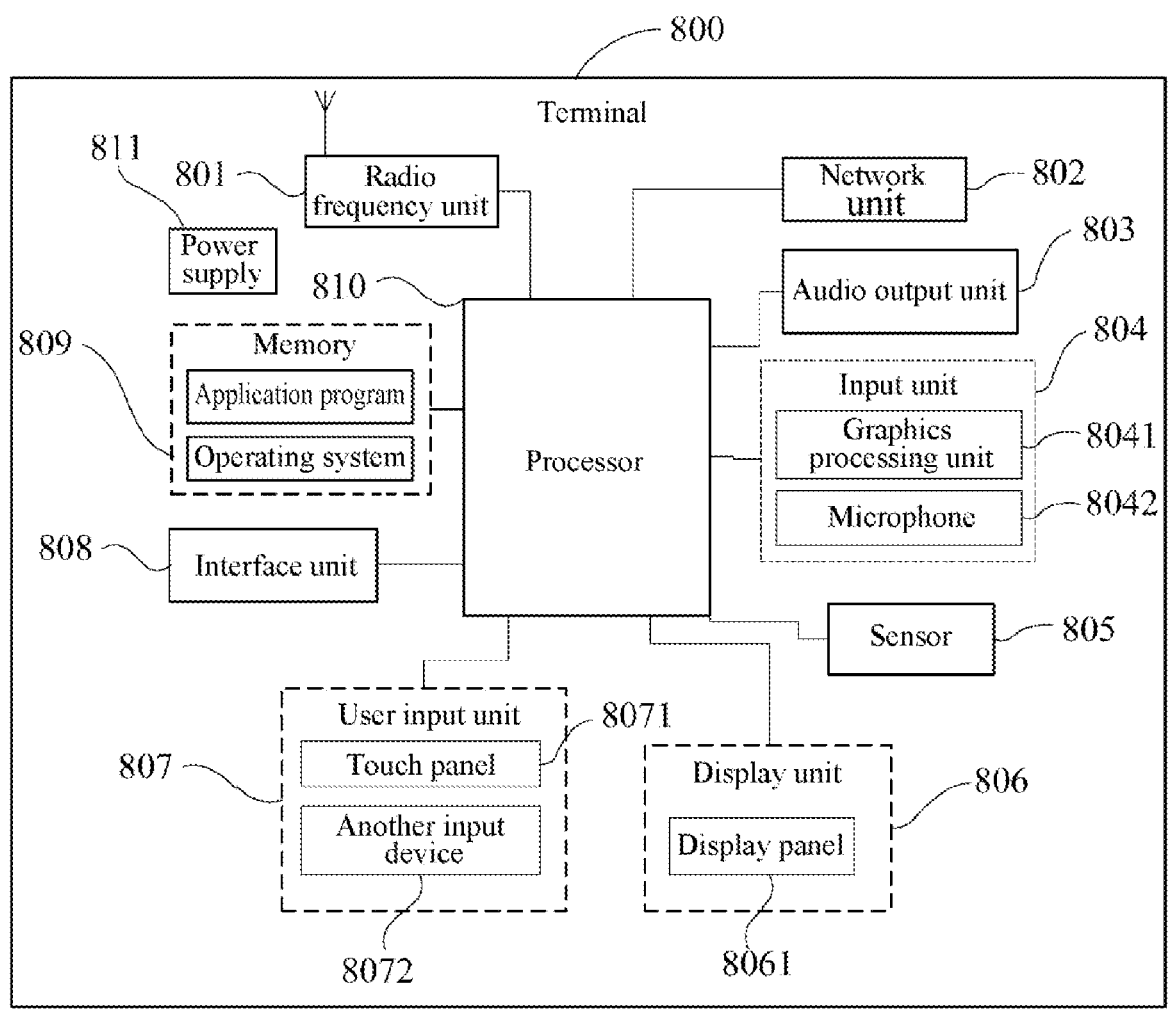
FIG. 7 is a schematic diagram of a hardware structure of a terminal according to an embodiment of the present disclosure.

FIG. 7 is a schematic diagram of a hardware structure of a terminal for implementing various embodiments of the present disclosure. The terminal 800 includes but is not limited to: components such as a radio frequency unit 801, a network unit 802, an audio output unit 803, an input unit 804, a sensor 805, a display unit 806, a user input unit 807, an interface unit 808, a memory 809, a processor 810, and a power supply 811. A person skilled in the art may understand that the terminal structure shown in FIG. 7 does not constitute a limitation on the terminal, and the terminal may include more or fewer components than shown, or combine some components, or have different component arrangements. In the embodiments of the present disclosure, the terminal includes but is not limited to a mobile phone, a tablet computer, a notebook computer, a handheld computer, an in-vehicle terminal, a wearable device, and a pedometer.

The radio frequency unit 801 or the processor 810 is configured to:
perform a first operation in a case that a monitoring resource in a power saving control channel conflicts with a resource corresponding to a first behavior, where the first operation includes one of the following:
monitoring the power saving control channel;
skipping monitoring the power saving control channel; and
skipping monitoring the power saving control channel in a control resource set CORESET based on a currently activated transmission configuration indicator TCI state.

In an embodiment, the first behavior includes at least one of the following:
synchronization signal block SSB measurement or channel state information reference signal CSI-RS measurement;
downlink control information DCI indicates that a part of a time domain resource of the monitoring resource in the power saving control channel is an uplink time domain resource or a flexible time domain resource;
DCI indicates that a part of the time domain resource of the monitoring resource in the power saving control channel is used to transmit a physical uplink control channel PUCCH, a physical uplink shared channel PUSCH, a physical random access channel PRACH, or a sounding reference signal SRS;
after initiating random access, the terminal monitors, on a part of the time domain resource in a monitoring occasion of the power saving control channel, a physical downlink control channel PDCCH scrambled by using a random access radio network temporary identifier RA-RNTI, and omits an activated TCI state of a CORESET associated with a random access response RAR search space;
a serving cell of the terminal changes;
a discontinuous reception DRX state of the terminal changes;
an activated bandwidth part BWP of the terminal changes; and
the terminal performs monitoring in S CORESETs on a time domain resource for monitoring the power saving control channel, where S is greater than 1.

In an embodiment, the SSB measurement or the CSI-RS measurement includes at least one of radio resource management RRM measurement, radio link monitoring RLM measurement, beam failure recovery BFR measurement, and layer 1 reference signal received power L1-RSRP measurement.

In an embodiment, the radio frequency unit 801 or the processor 810 is further configured to:
when the monitoring resource in the power saving control channel and a measurement resource corresponding to the SSB measurement or the CSI-RS measurement are overlapped on any time domain resource, determine that the monitoring resource in the power saving control channel conflicts with the measurement resource corresponding to the SSB measurement or the CSI-RS measurement; or,
when a time interval between the monitoring resource in the power saving control channel and a measurement resource corresponding to the SSB measurement or the CSI-RS measurement is less than or equal to a preset value, determine that the monitoring resource in the power saving control channel conflicts with the measurement resource corresponding to the SSB measurement or the CSI-RS measurement.

In an embodiment, when the terminal skips monitoring the power saving control channel in a CORESET based on a currently activated TCI state, the radio frequency unit 801 or the processor 810 is further configured to:
monitor the control channel in the CORESET associated with the RAR search space based on the activated TCI state of the CORESET associated with the RAR search space.

In an embodiment, when the terminal skips monitoring the power saving control channel, the radio frequency unit 801 or the processor 810 is further configured to:
perform a default behavior in discontinuous reception onduration associated with monitoring of the power saving control channel; or
skip performing a default behavior in discontinuous reception onduration associated with monitoring of the power saving control channel, where
the default behavior includes at least one of the following:
starting a discontinuous reception onduration timer;
monitoring a PDCCH according to a configuration of a network side device;
periodically or semi-persistently transmitting an SRS according to a configuration of a network side device;

periodically or semi-persistently reporting channel state information CSI according to a configuration of a network side device; and performing the SSB measurement or the CSI-RS measurement.

In an embodiment, the radio frequency unit 801 or the processor 810 is further configured to:

when the network side device configures N monitoring resources of the power saving control channel and the terminal gives up monitoring the power saving control channel on M monitoring resources, perform, by the terminal, the default behavior in the discontinuous reception onduration associated with the monitoring resource in the power saving control channel, where N is greater than or equal to 1, and M is less than or equal to N; or, when the network side device configures that the terminal monitors the power saving control channel in X CORESETs and the terminal gives up monitoring the power saving control channel on all monitoring resources corresponding to Y CORESETs, perform, by the terminal, the default behavior in the discontinuous reception onduration associated with the monitoring resource in the power saving control channel, where X is greater than or equal to 1, and Y is less than or equal to X; or, when the network side device configures that the terminal monitors the power saving control channel based on L TCI states and the terminal gives up monitoring the power saving control channel on all monitoring resources corresponding to P TCI states, perform, by the terminal, the default behavior in the discontinuous reception onduration associated with the monitoring resource in the power saving control channel, where L is greater than or equal to 1, and P is less than or equal to L.

In an embodiment, the radio frequency unit 801 or the processor 810 is further configured to:

receive radio resource control RRC information sent by the network side device; and when the RRC information indicates the terminal to perform the default behavior, the radio frequency unit 801 or the processor 810 is further configured to perform the default behavior in the discontinuous reception onduration associated with the monitoring resource in the power saving control channel; or, when the RRC information indicates the terminal not to perform the default behavior, the radio frequency unit 801 or the processor 810 is configured to skip performing the default behavior in the discontinuous reception onduration associated with the monitoring resource in the power saving control channel.

In the embodiments of the present disclosure, the terminal may determine a monitoring behavior of the power saving control channel according to a signal processing priority in a case that the monitoring resource in the power saving control channel conflicts with a resource corresponding to another behavior. As can be seen, in the embodiments of the present disclosure, the monitoring behavior performed by the terminal on the power saving control channel is determined, helping to improve communication performance of the terminal.

It should be understood that, in this embodiment of the present disclosure, the radio frequency unit 801 may be configured to receive and send a signal during an information receiving and sending process or a call process. Specifically, the radio frequency unit receives downlink data from a base station, then delivers the downlink information to the processor 810 for processing, and sends related uplink data to the base station. Generally, the radio frequency unit 801 includes, but is not limited to, an antenna, at least one amplifier, a transceiver, a coupler, a low noise amplifier, a duplexer, and the like. In addition, the radio frequency unit 801 may further communicate with another device through wireless communication. In addition, the radio frequency unit 801 may further communicate with the network and another device through wireless communication system.

The terminal provides the user with wireless broadband Internet access through a network unit 802, such as helping the user to send and receive emails, browse web pages, and access streaming media.

An audio output unit 803 may convert audio data received by the radio frequency unit 801 or the network unit 802 or stored in a memory 809 into an audio signal and output as sound. In addition, the audio output unit 803 may further provide an audio output that is related to a particular function executed by the terminal 800 (for example, a call signal receiving sound or a message receiving sound). The audio output unit 803 includes a loudspeaker, a buzzer, a receiver, and the like.

An input unit 804 is configured to receive an audio signal or a video signal. The input unit 804 may include a graphics processing unit (Graphics Processing Unit, GPU) 8041 and a microphone 8042. The graphics processing unit 8041 performs processing on image data of a static picture or a video that is obtained by an image acquisition device (for example, a camera) in a video acquisition mode or an image acquisition mode. An image frame that has been processed may be displayed on a display unit 806. An image frame that has been processed by the graphics processing unit 8041 may be stored in the memory 809 (or another storage medium) or sent by using the radio frequency unit 801 or the network unit 802. The microphone 8042 can receive sound and can process such sound into audio data. The processed audio data may be transferred, in a phone talk mode, to a format that may be sent to a mobile communication base station via the radio frequency unit 801 to output.

The terminal 800 further includes at least one sensor 805, such as an optical sensor, a motion sensor, and other sensors. Specifically, the optical sensor includes an ambient light sensor and a proximity sensor. The ambient light sensor may adjust luminance of the display panel 8061 according to brightness of the ambient light. The proximity sensor may switch off the display panel 8061 and backlight when the terminal 800 is moved to the ear. As one type of motion sensor, an acceleration sensor may detect magnitude of accelerations in various directions (which generally are triaxial), may detect magnitude and a direction of the gravity when static, and may be configured to identify a terminal attitude (such as switchover between horizontal and vertical screens, a related game, and attitude calibration of a magnetometer), a related function of vibration identification (such as a pedometer and a knock); and the sensor 805 may further include a fingerprint sensor, a pressure sensor, an iris sensor, a molecular sensor, a gyroscope, a barometer, a hygrometer, a thermometer, an infrared sensor, etc., which are not be repeated herein.

A display unit 806 is configured to display information input by the user or information provided for the user. The display unit 806 may include a display panel 8061. The display panel 8061 may be configured by using a liquid crystal display (LCD), an organic light-emitting diode (OLED), or the like.

A user input unit 807 may be configured to: receive input digit or character information, and generate a keyboard signal input related to a user setting and function control of the terminal. Specifically, the user input unit 807 includes a touch panel 8071 and another input device 8072. The touch panel 8071, also referred to as a touchscreen, may collect a touch operation of a user on or near the touch panel (such as an operation of a user on or near the touch panel 8071 by using any suitable object or attachment, such as a finger or a touch pen). The touch panel 8071 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and transmits the touch point coordinates to the processor 810. Moreover, the touch controller may receive and execute a command transmitted from the processor 810. In addition, the touch panel 8071 may be implemented by using various types, such as a resistive type, a capacitance type, an infrared type, and a surface acoustic wave type. In addition to the touch panel 8071, the user input unit 807 may further include the another input device 8072. Specifically, the another input device 8072 may include, but is not limited to, a physical keyboard, a functional key (such as a volume control key or a switch key), a track ball, a mouse, and a joystick, which are not repeated herein.

Further, the touch panel 8071 may cover the display panel 8061. After detecting a touch operation on or near the touch panel 8071, the touch panel transfers the touch operation to the processor 810, to determine a type of a touch event. Then, the processor 810 provides a corresponding visual output on the display panel 8061 according to the type of the touch event. In FIG. 7, the touch panel 8071 and the display panel 8061 implement, as two independent parts, input and output functions of the terminal device. However, in some embodiments, the touch panel 8071 and the display panel 8061 may be integrated to implement the input and output functions of the terminal device, which is not specifically limited herein.

An interface unit 808 is an interface for connecting an external device to the terminal 800. For example, the external apparatus may include a wired or wireless headset port, an external power supply (or a battery charger) port, a wired or wireless data port, a storage card port, a port used to connect an apparatus having an identifier, an audio input/output (I/O) port, a video I/O port, an earphone port, and the like. The interface unit 808 may be configured to receive an input (for example, data information or power) from an external apparatus, and transmit the received input to one or more elements in the terminal 800, or may be configured to transmit data between the terminal 800 and the external apparatus.

The memory 809 may be configured to store a software program and various data. The memory 809 may mainly include a program storage area and a data storage area. The program storage area may store an operating system, an application program required by at least one function (such as a sound playback function and an image display function), and the like. The data storage area may store data (such as audio data and an address book) created according to the use of the mobile phone, and the like. In addition, the memory 809 may include a high-speed random access memory, and may also include a nonvolatile memory, for example, at least one magnetic disk storage device, a flash memory, or another volatile solid-state storage device.

The processor 810 is a control center of the terminal, and connects to various parts of the terminal by using various interfaces and lines. By running or executing the software program and unit stored in the memory 809, and invoking data stored in the memory 809, the processor performs various functions and data processing of the terminal, thereby performing overall monitoring on the terminal. The processor 810 may include one or more processing units; and in an embodiment, the processor 810 may integrate an application processor and a modem processor. The application processor mainly processes an operating system, a user interface, an application program, and the like. The modem processor mainly processes wireless communication. It may be understood that, the modem processor may alternatively not be integrated in the processor 810.

The terminal 800 may further include the power supply 811 (such as a battery) for supplying power to the components. In an embodiment, the power supply 811 may be logically connected to the processor 810 by using a power management system, thereby implementing functions, such as charging, discharging, and power consumption management, by using the power management system.

In addition, the terminal 800 includes some unshown functional units, which is not repeated herein.

In an embodiment, the embodiments of the present disclosure further provide a terminal, including a processor 810, a memory 809, a computer program stored in the memory 809 and a computer program stored in the memory 809 and running on the processor 810. When the computer program is executed by the processor 810, each process of the foregoing embodiments of the channel monitoring control method can be achieved, and the same technical effect can be achieved. In order to avoid repetition, details are not repeated herein.

It should be noted that the terminal 800 in this embodiment may be the terminal in any implementation in the method embodiment in the embodiments of the present disclosure, and any implementation of the terminal in the method embodiment in the embodiments of the present disclosure may be implemented by the foregoing terminal 800 in this embodiment, and a same beneficial effect is achieved. Details are not described herein again.

An embodiment of this specification further provides a computer-readable storage medium, storing a computer program, where the computer program, when executed by a processor, implements each process of the foregoing embodiments corresponding to the terminal or the network side, and the same technical effect can be achieved. To avoid repetition, details are not repeated herein. The computer-readable storage medium may include a flash drive, a read-only memory (Read-Only Memory, ROM), a random access memory (Random Access Memory, RAM), a magnetic disk, or an optical disc.

It should be noted that the terms "include," "comprise," or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present disclosure essentially or the part contributing to the related technology may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

What is claimed is:

1. A channel monitoring control method, performed by a terminal, wherein the method comprises:
    performing a first operation in a case that a monitoring resource of a power saving control channel conflicts with a resource corresponding to a first behavior, wherein
    the first operation comprises
    skipping monitoring the power saving control channel,
    wherein the first behavior comprises downlink control information (DCI) indicates that a part of a time domain resource of the monitoring resource of the power saving control channel is an uplink time domain resource or a flexible time domain resource, and after initiating random access, the terminal monitors, on a part of the time domain resource in a monitoring occasion of the power saving control channel, a physical downlink control channel (PDCCH) scrambled by using a random access radio network temporary identifier (RA-RNTI), and omits an activated transmission configuration indicator (TCI) state of a control resource set (CORESET) associated with a random access response RAR search space;
    wherein when the terminal skips monitoring the power saving control channel, the method further comprises:
    performing a default behavior in discontinuous reception onduration associated with the monitoring resource of the power saving control channel, wherein the default behavior comprises: starting a discontinuous reception onduration timer.

2. The method according to claim 1, wherein the first behavior further comprises at least one of the following:
    synchronization signal block (SSB) measurement or channel state information reference signal (CSI-RS) measurement;
    the DCI indicates that a part of the time domain resource of the monitoring resource of the power saving control channel is used to transmit a physical uplink control channel (PUCCH), a physical uplink shared channel (PUSCH), a physical random access channel (PRACH), or a sounding reference signal (SRS);
    a serving cell of the terminal changes;
    a discontinuous reception (DRX) state of the terminal changes;
    an activated bandwidth part (BWP) of the terminal changes; and
    the terminal performs monitoring in S CORESETs on the time domain resource for monitoring the power saving control channel, wherein S is greater than 1.

3. The method according to claim 2, wherein the SSB measurement or the CSI-RS measurement comprises at least one of radio resource management (RRM) measurement, radio link monitoring (RLM) measurement, beam failure recovery (BFR) measurement, and layer 1 reference signal received power (L1-RSRP) measurement.

4. The method according to claim 2, wherein when the monitoring resource of the power saving control channel and a measurement resource corresponding to the SSB measurement or the CSI-RS measurement are overlapped on any time domain resource, it is determined that the monitoring resource of the power saving control channel conflicts with the measurement resource corresponding to the SSB measurement or the CSI-RS measurement;
    or,
    when a time interval between the monitoring resource of the power saving control channel and a measurement resource corresponding to the SSB measurement or the CSI-RS measurement is less than or equal to a preset value, it is determined that the monitoring resource of the power saving control channel conflicts with the measurement resource corresponding to the SSB measurement or the CSI-RS measurement.

5. The method according to claim 1, wherein
    the default behavior further comprises at least one of the following:
    monitoring the PDCCH according to a configuration of a network side device;
    periodically or semi-persistently transmitting an SRS according to a configuration of a network side device;
    periodically or semi-persistently reporting channel state information (CSI) according to a configuration of a network side device; and
    performing the SSB measurement or the CSI-RS measurement.

6. The method according to claim 5, wherein when the network side device configures N monitoring resources of the power saving control channel and the terminal gives up monitoring the power saving control channel on M monitoring resources, the terminal performs the default behavior in the discontinuous reception onduration associated with the monitoring resource of the power saving control channel, wherein N is greater than or equal to 1, and M is less than or equal to N;
    or,
    when the network side device configures that the terminal monitors the power saving control channel in X CORESETs and the terminal gives up monitoring the power saving control channel on all monitoring resources corresponding to Y CORESETs, the terminal performs the default behavior in the discontinuous reception onduration associated with the monitoring resource of the power saving control channel, wherein X is greater than or equal to 1, and Y is less than or equal to X;
    or,
    when the network side device configures that the terminal monitors the power saving control channel based on L TCI states and the terminal gives up monitoring the power saving control channel on all monitoring resources corresponding to P TCI states, the terminal performs the default behavior in the discontinuous reception onduration associated with the monitoring resource of the power saving control channel, wherein L is greater than or equal to 1, and P is less than or equal to L.

7. The method according to claim 5, further comprising:
receiving radio resource control (RRC) information sent by the network side device; and
when the RRC information indicates the terminal to perform the default behavior, performing, by the terminal, the default behavior in the discontinuous reception onduration associated with the monitoring resource of the power saving control channel.

8. A terminal, comprising: a memory, a processor, and a computer program stored in the memory and executable on the processor, wherein when executed by the processor, the computer program causes the terminal to implement:
performing a first operation in a case that a monitoring resource of a power saving control channel conflicts with a resource corresponding to a first behavior, wherein
the first operation comprises
skipping monitoring the power saving control channel, wherein the first behavior comprises downlink control information (DCI) indicates that a part of a time domain resource of the monitoring resource of the power saving control channel is an uplink time domain resource or a flexible time domain resource, and after initiating random access, the terminal monitors, on a part of the time domain resource in a monitoring occasion of the power saving control channel, a physical downlink control channel (PDCCH) scrambled by using a random access radio network temporary identifier (RA-RNTI), and omits an activated transmission configuration indicator (TCI) state of a control resource set (CORESET) associated with a random access response RAR search space;
wherein when the terminal skips monitoring the power saving control channel, the method further comprises:
performing a default behavior in discontinuous reception onduration associated with the monitoring resource of the power saving control channel, wherein the default behavior comprises starting a discontinuous reception onduration timer.

9. The terminal according to claim 8, wherein the first behavior further comprises at least one of the following:
synchronization signal block (SSB) measurement or channel state information reference signal (CSI-RS) measurement;
the DCI indicates that a part of the time domain resource of the monitoring resource of the power saving control channel is used to transmit a physical uplink control channel (PUCCH), a physical uplink shared channel (PUSCH), a physical random access channel (PRACH), or a sounding reference signal (SRS);
a serving cell of the terminal changes;
a discontinuous reception (DRX) state of the terminal changes;
an activated bandwidth part (BWP) of the terminal changes; and
the terminal performs monitoring in S CORESETs on the time domain resource for monitoring the power saving control channel, wherein S is greater than 1.

10. The terminal according to claim 9, wherein the SSB measurement or the CSI-RS measurement comprises at least one of radio resource management (RRM) measurement, radio link monitoring (RLM) measurement, beam failure recovery (BFR) measurement, and layer 1 reference signal received power (L1-RSRP) measurement.

11. The terminal according to claim 9, wherein when the monitoring resource of the power saving control channel and a measurement resource corresponding to the SSB measurement or the CSI-RS measurement are overlapped on any time domain resource, it is determined that the monitoring resource of the power saving control channel conflicts with the measurement resource corresponding to the SSB measurement or the CSI-RS measurement;
or,
when a time interval between the monitoring resource of the power saving control channel and a measurement resource corresponding to the SSB measurement or the CSI-RS measurement is less than or equal to a preset value, it is determined that the monitoring resource of the power saving control channel conflicts with the measurement resource corresponding to the SSB measurement or the CSI-RS measurement.

12. The terminal according to claim 8, wherein
the default behavior further comprises at least one of the following:
monitoring the PDCCH according to a configuration of a network side device;
periodically or semi-persistently transmitting an SRS according to a configuration of a network side device;
periodically or semi-persistently reporting channel state information (CSI) according to a configuration of a network side device; and
performing the SSB measurement or the CSI-RS measurement.

13. The terminal according to claim 12, wherein when the network side device configures N monitoring resources of the power saving control channel and the terminal gives up monitoring the power saving control channel on M monitoring resources, the terminal performs the default behavior in the discontinuous reception onduration associated with the monitoring resource of the power saving control channel, wherein N is greater than or equal to 1, and M is less than or equal to N;
or,
when the network side device configures that the terminal monitors the power saving control channel in X CORESETs and the terminal gives up monitoring the power saving control channel on all monitoring resources corresponding to Y CORESETs, the terminal performs the default behavior in the discontinuous reception onduration associated with the monitoring resource of the power saving control channel, wherein X is greater than or equal to 1, and Y is less than or equal to X;
or,
when the network side device configures that the terminal monitors the power saving control channel based on L TCI states and the terminal gives up monitoring the power saving control channel on all monitoring resources corresponding to P TCI states, the terminal performs the default behavior in the discontinuous reception onduration associated with the monitoring resource of the power saving control channel, wherein L is greater than or equal to 1, and P is less than or equal to L.

14. A non-transitory computer-readable storage medium, wherein the computer-readable storage medium stores a computer program, and when the computer program is executed by a processor, the computer program causes the processor to implement:

performing a first operation in a case that a monitoring resource of a power saving control channel conflicts with a resource corresponding to a first behavior, wherein the first operation comprises skipping monitoring the power saving control channel, wherein the first behavior comprises downlink control information (DCI) indicates that a part of a time domain resource of the monitoring resource of the power saving control channel is an uplink time domain resource or a flexible time domain resource, and after initiating random access, the terminal monitors, on a part of the time domain resource in a monitoring occasion of the power saving control channel, a physical downlink control channel (PDCCH) scrambled by using a random access radio network temporary identifier (RA-RNTI), and omits an activated transmission configuration indicator (TCI) state of a control resource set (CORESET) associated with a random access response RAR search space, when skipping monitoring the power saving control channel, the computer program causes the processor to further implement:

performing a default behavior in discontinuous reception onduration associated with the monitoring resource of the power saving control channel, wherein the default behavior comprises: starting a discontinuous reception onduration timer.

15. The non-transitory computer-readable storage medium according to claim 14, wherein the first behavior comprises at least one of the following:

synchronization signal block (SSB) measurement or channel state information reference signal CSI-RS measurement;

the DCI indicates that a part of the time domain resource of the monitoring resource of the power saving control channel is used to transmit a physical uplink control channel (PUCCH), a physical uplink shared channel (PUSCH), a physical random access channel (PRACH), or a sounding reference signal (SRS);

a serving cell of the terminal changes;

a discontinuous reception (DRX) state of the terminal changes;

an activated bandwidth part (BWP) of the terminal changes; and the terminal performs monitoring in S CORESETs on the time domain resource for monitoring the power saving control channel, wherein S is greater than 1.

16. The non-transitory computer-readable storage medium according to claim 15, wherein when the monitoring resource of the power saving control channel and a measurement resource corresponding to the SSB measurement or the CSI-RS measurement are overlapped on any time domain resource, it is determined that the monitoring resource of the power saving control channel conflicts with the measurement resource corresponding to the SSB measurement or the CSI-RS measurement;

or, when a time interval between the monitoring resource of the power saving control channel and a measurement resource corresponding to the SSB measurement or the CSI-RS measurement is less than or equal to a preset value, it is determined that the monitoring resource of the power saving control channel conflicts with the measurement resource corresponding to the SSB measurement or the CSI-RS measurement.

17. The non-transitory computer-readable storage medium according to claim 14, wherein the default behavior comprises at least one of the following:

monitoring the PDCCH according to a configuration of a network side device;

periodically or semi-persistently transmitting an SRS according to a configuration of a network side device;

periodically or semi-persistently reporting channel state information (CSI) according to a configuration of a network side device; and performing the SSB measurement or the CSI-RS measurement.

18. The non-transitory computer-readable storage medium according to claim 17, wherein when the network side device configures N monitoring resources of the power saving control channel and the terminal gives up monitoring the power saving control channel on M monitoring resources, the terminal performs the default behavior in the discontinuous reception onduration associated with the monitoring resource of the power saving control channel, wherein N is greater than or equal to 1, and M is less than or equal to N;

or, when the network side device configures that the terminal monitors the power saving control channel in X CORESETs and the terminal gives up monitoring the power saving control channel on all monitoring resources corresponding to Y CORESETs, the terminal performs the default behavior in the discontinuous reception onduration associated with the monitoring resource of the power saving control channel, wherein X is greater than or equal to 1, and Y is less than or equal to X;

or, when the network side device configures that the terminal monitors the power saving control channel based on L TCI states and the terminal gives up monitoring the power saving control channel on all monitoring resources corresponding to P TCI states, the terminal performs the default behavior in the discontinuous reception onduration associated with the monitoring resource of the power saving control channel, wherein L is greater than or equal to 1, and P is less than or equal to L.

* * * * *